(12) United States Patent
Tardy-Tuch

(10) Patent No.: US 7,422,222 B2
(45) Date of Patent: Sep. 9, 2008

(54) TRANSPORT PROTECTION FOR CABLE ENDS ON COMPRESSION STRUTS

(75) Inventor: Georg von Tardy-Tuch, Malmsheim (DE)

(73) Assignee: Dr. Ing. h.c.F. Porsche Akteingesellschaft, Stuttgart (DE)

( * ) Notice: Subject to any disclaimer, the term of this patent is extended or adjusted under 35 U.S.C. 154(b) by 258 days.

(21) Appl. No.: 11/130,270

(22) Filed: May 17, 2005

(65) Prior Publication Data

US 2005/0258615 A1 Nov. 24, 2005

(30) Foreign Application Priority Data

May 18, 2004 (DE) .................. 10 2004 024 522

(51) Int. Cl.
 *B60G 15/00* (2006.01)
(52) U.S. Cl. .................................. 280/124.147
(58) Field of Classification Search .......... 280/124.146, 280/124.147; 206/591, 592, 593; 248/205.1; 493/269
See application file for complete search history.

(56) References Cited

U.S. PATENT DOCUMENTS

| | | | |
|---|---|---|---|
| 2,296,352 A * | 9/1942 | Keller ..................... 249/19 |
| 4,576,258 A * | 3/1986 | Spisak et al. ............. 188/266.3 |
| 4,660,688 A * | 4/1987 | Spisak et al. ............. 188/266.2 |
| 5,769,401 A | 6/1998 | Pradel |
| 6,345,706 B1 | 2/2002 | Oliver et al. |
| 7,160,236 B2 * | 1/2007 | Valls Roca et al. .......... 493/269 |
| 2004/0140642 A1 * | 7/2004 | Perello et al. ......... 280/124.147 |

FOREIGN PATENT DOCUMENTS

| | | |
|---|---|---|
| DE | 33 13 388 A1 | 1/1984 |
| DE | 33 13 388 C2 | 1/1984 |
| DE | 44 14 662 A1 | 11/1994 |
| GB | 2 123 112 A | 1/1984 |
| JP | 64-26042 A | 1/1989 |
| JP | 1-269742 A | 10/1989 |

* cited by examiner

*Primary Examiner*—Christopher Ellis
*Assistant Examiner*—Robert A. Coker
(74) *Attorney, Agent, or Firm*—Crowell & Moring LLP

(57) ABSTRACT

Transport protection is provided for cable ends on compression struts of motor vehicles in which the cable ends protrude from hollow piston rods. In order to create transport protection which protects a cable end from damage, a pipe section is provided on the end of the compression strut at which the cable end protrudes from a hollow piston rod. The inside of the pipe section accommodates the rolled-up cable end and has an inside diameter selected to be greater than the outer area of the end region of the piston rod.

2 Claims, 2 Drawing Sheets

TRANSPORT PROTECTION FOR CABLE ENDS ON COMPRESSION STRUTS

This application claims the priority of German application 10 2004 024 522.3, filed May 18, 2004, the disclosure of which is expressly incorporated by reference herein.

BACKGROUND AND SUMMARY OF THE INVENTION

This invention relates to transport protection for cable ends on compression struts of motor vehicles in which the cable ends protrude from hollow piston rods. Such compression struts may be, for example, compression struts with electrically adjustable damping devices.

In such compression struts, the cable ends can become damaged during transport of the compression struts. Such damage is difficult to fix, and requires disassembling the compression strut.

It is therefore an object of the invention to create transport protection which protects the cable ends from damage.

It is suggested in accordance with the invention to provide a pipe section as transport protection on an end of a compression strut from which the cable end protrudes from a hollow piston rod such that the rolled-up cable end is accommodated on the inside of the pipe section. The inside diameter of the pipe section is selected such that it is greater than the outer area of the end region of the piston rod. The end region of the piston rod in common compression struts also comprises a nut, which is used to fasten the piston rod. The pipe section is hence only held by the rolled-up cable end which, upon insertion into the pipe section, tends to relax, and thus generates a clamping effect on the inside wall of the pipe section. It is a particular advantage in this arrangement that the transport protection is held in the very place where it is supposed to unfold so as to effect protection, namely, on the cable end. By contrast, the transport protection is able to move in the end region of the piston rod. In this way, it is possible to leave the transport protection on the compression strut even during assembly of the compression strut to the vehicle body and thus protect the cable end until the compression strut has assumed its final, mounted position. The pipe section can use a corresponding opening in the body, through which the cable end is supposed to be guided, to align itself with the opening. A cover created this way prevents the cable end from extending over edges, corners and protrusions of the compression strut and from becoming squeezed between the edge, corner or protrusion and a transport device and being damaged. Furthermore, seizing the cable end or lifting the compression strut is avoided.

Advantageous embodiments of the invention are claimed.

Designing one end region of the pipe section in a tapered fashion, for example, is suggested. The pipe section is then placed on top of the compression strut such that its tapered end points away from the compression strut.

The tapered end forms an insertion aid, which facilitates guidance of the pipe section through the corresponding opening in the vehicle body.

In order to ensure safe guidance of the pipe section during assembly of the compression strut, the pipe section is selected so as to have such a length that at least a portion, for example one centimeter, of the non-tapered region extends through the vehicle body opening in the installed state.

The pipe section is preferably made of cardboard since this material is inexpensive to produce, easy to manipulate and disposable in an environmentally friendly manner.

An embodiment of the invention is illustrated in greater detail in the figures.

DETAILED DESCRIPTION OF THE INVENTION

Figure 1:
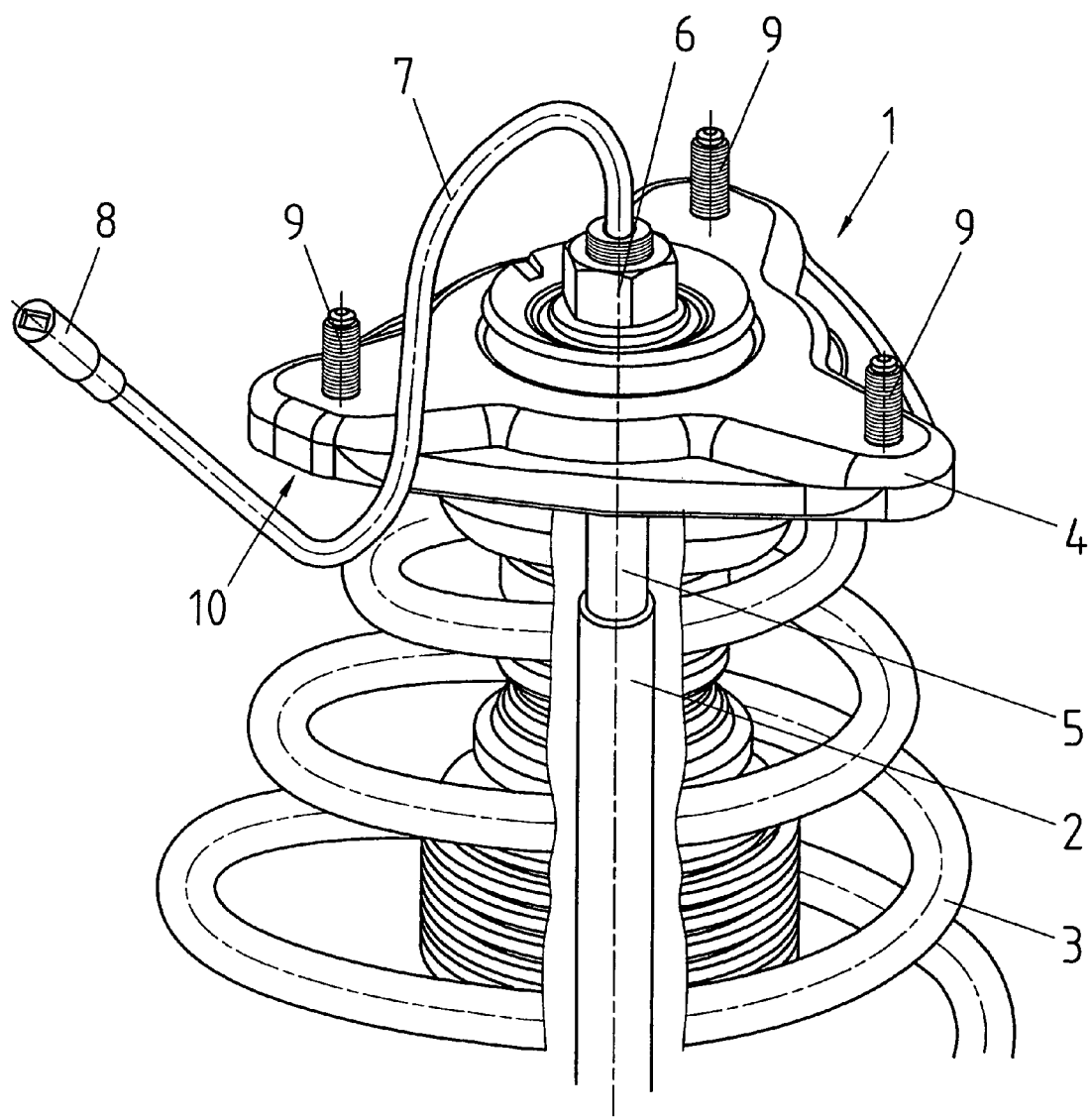
FIG. 1 illustrates an upper region of a compression strut with a cable end.

The compression strut 1, shown only in the area of one end region, has a damper 2, a spring 3, and a single thrust bearing 4. A piston rod 5 of the damper 2 is connected to the single thrust bearing 4 by means of a screw assembly, of which here only the nut 6 is shown. The piston rod 5 is hollow and accommodates a cable, of which only the cable end 7 protruding from the piston rod 5 is visible in this illustration. At its terminus, the cable end 7 is equipped with a plug 8. To attach the single thrust bearing 4 to a vehicle body 13, three fastening devices, in this case screws 9, are provided, which are firmly connected to the single thrust bearing 4.

Figure 2:
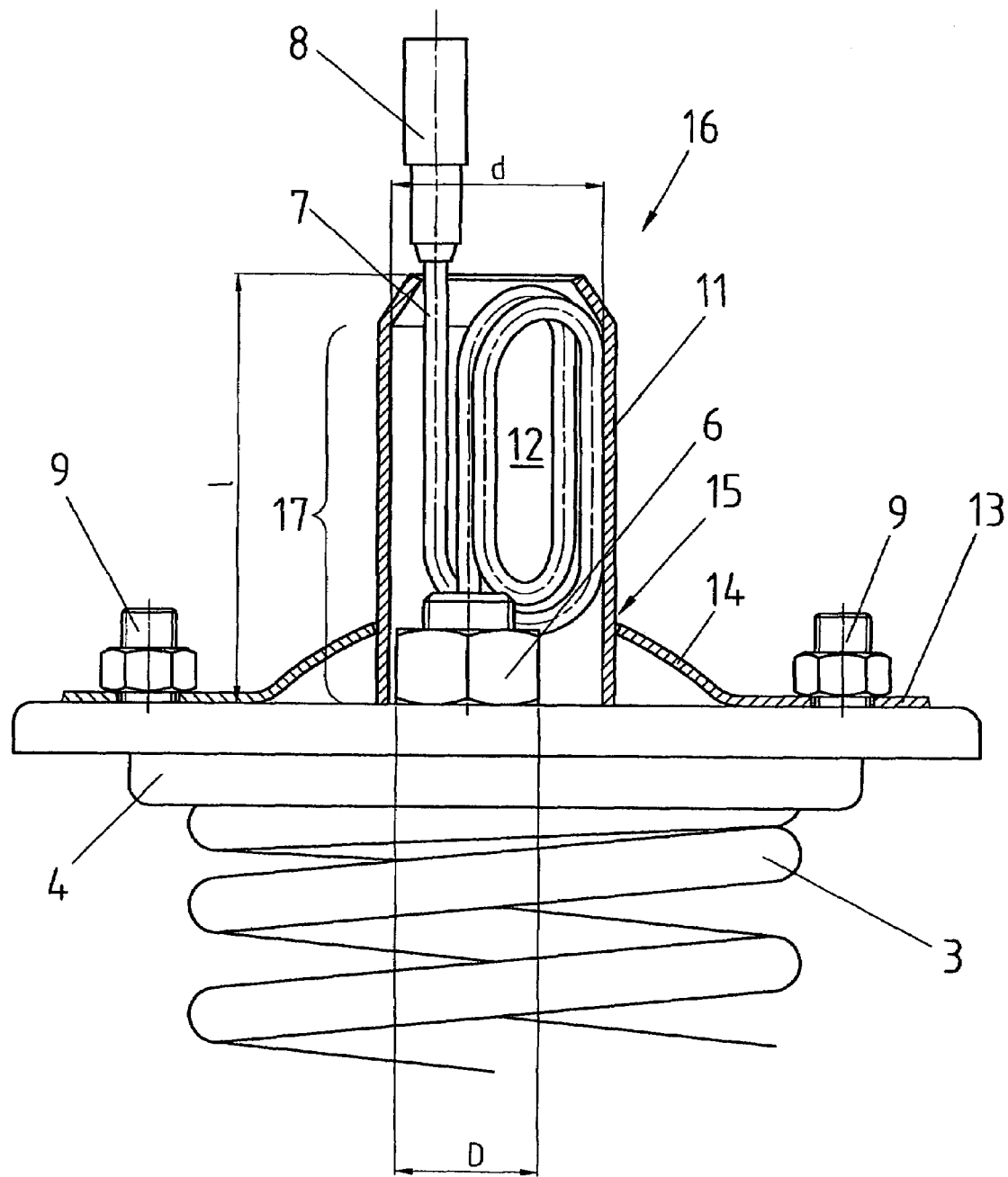
FIG. 2 is a sectional view of a pipe section used as transport protection in the mounted state.

In order to prevent the cable end 7 from extending over an edge 10 of the single thrust bearing 4 during transport of the compression strut 1, as shown in FIG. 1, and for example becoming squeezed against a transport device during impact on the edge 10, the cable 7 is rolled up as illustrated in FIG. 2 and held in a pipe section 11. When rolling up the cable end 7 into a wrapped cable unit 12, the diameter of the wrapped cable unit 12 is selected such that it is greater than the inside diameter of the pipe section 11. To insert it into the pipe section 11, the wrapped cable unit 12 must therefore be pressed together, and in the illustrated mounted state it presses against the inside wall of the pipe section 11 so that the wrapped cable unit 12 generates a clamping effect on the inside of the pipe section 11 and thus holds the pipe section 11 in its position.

In the area of the single thrust bearing 4, the vehicle body 13 forms an arbor or bulge 14 with an opening 15 arranged centrally, but not centrally to the piston rod 5.

The pipe section 11 is equipped with an indentation, i.e. is tapered, at its upper, axial end region 16. During assembly of the compression strut to the vehicle body 13, initially the tapered area 16 of the pipe section 11 extends through the opening 15. The tapered area 16 hereby acts as an insertion aid in order to align the pipe section 11 by way of a motion around the nut 6 such that it can extend through the opening 15. For this, it is required that the inside diameter of the pipe section 11 be selected significantly larger than the outer diameter D of the nut 6.

The axial length 1 of the pipe section 11 is dimensioned such that at least the cable end 12 is accommodated in its entirety. Beyond that it should be noted that at least a portion of the non-tapered region 17 extends through the opening 15 in the mounted state and protrudes there by at least one centimeter in order to be able to provide for gripping the pipe section 11 securely and permit pulling it out of the opening 15.

As illustrated in FIG. 2, in the mounted state of the pipe section 11, both the cable end 7, which is rolled up into a wrapped cable unit 12, and the plug 8 can be accommodated completely in the pipe section 11 so that the pipe section 11 acts as a transport protection for the cable end 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

I claim:

1. Transport protection for a cable end on a compression strut of a motor vehicle, the cable end protruding from a hollow piston rod, comprising a pipe section held on the compression strut of the motor vehicle in an area where the cable end protrudes from the piston rod, wherein the pipe section accommodates the cable end when the cable end is rolled up, wherein an inside diameter of the pipe section is greater than an outer diameter of an end region of the piston rod, and wherein the pipe section consists of cardboard.

2. Transport protection according to claim 1, wherein the pipe section has a tapered design in one axial end region.

* * * * *